Sept. 7, 1937.     H. L. BREITENSTEIN     2,092,367
OUTLET BOX
Original Filed Dec. 19, 1932
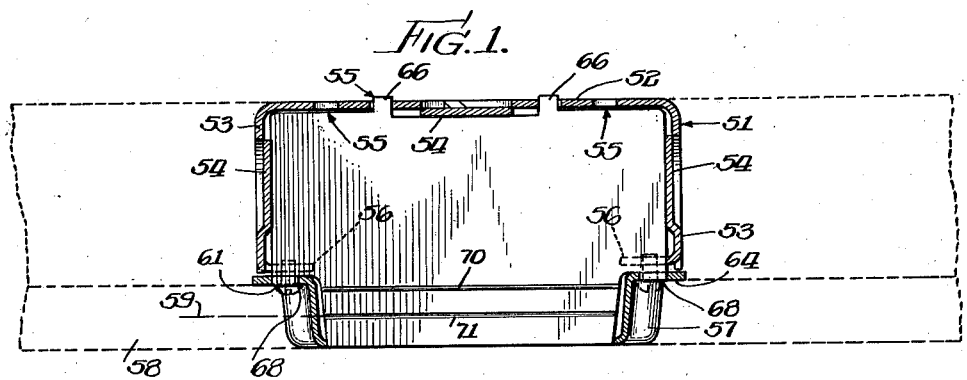
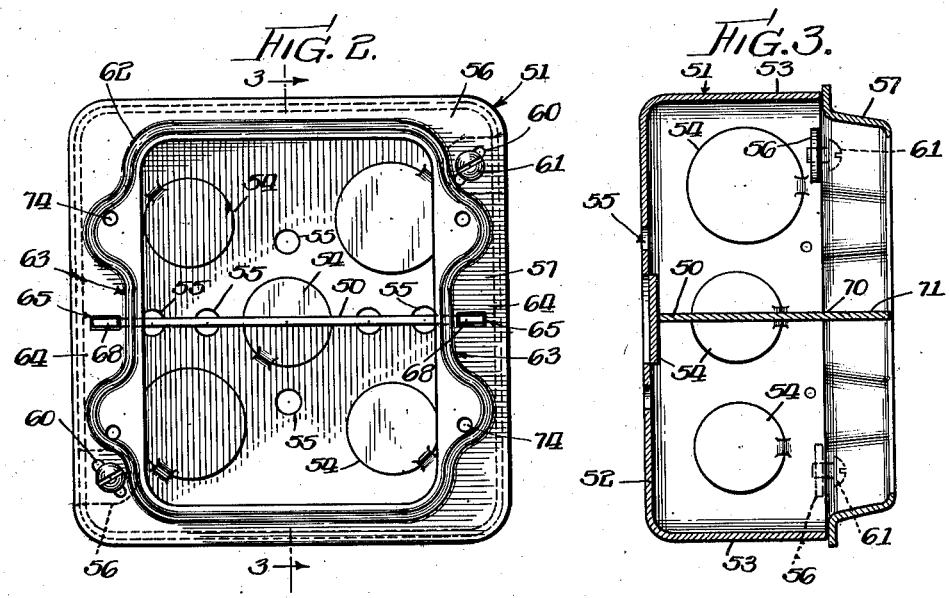
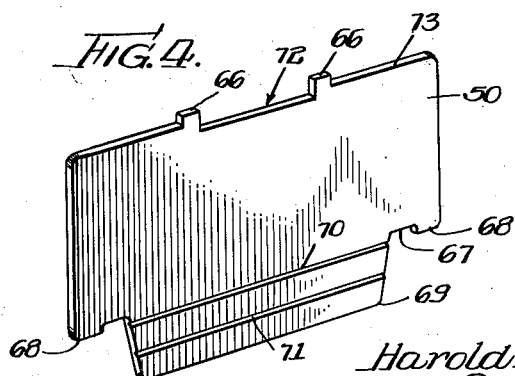
Inventor:
Harold L. Breitenstein
By: Cox & Moore, attys.

Patented Sept. 7, 1937

2,092,367

UNITED STATES PATENT OFFICE 2,092,367

OUTLET BOX

Harold L. Breitenstein, Aurora, Ill., assignor to All-Steel-Equip Company, Aurora, Ill., a corporation of Illinois Original application December 19, 1932, Serial No. 647,948. Patent No. 2,028,509. Divided and this application March 22, 1934, Serial No. 716,793

1 Claim. (Cl. 247—15)

This invention relates to electrical receptacles, and particularly to an electric outlet box.

This application is a division of application, Serial No. 647,948, filed December 19, 1932 and which has now become Patent No. 2,028,509.

The primary object of the invention is to provide a new and improved outlet box having certain parts arranged and constructed to fully cooperate with each other, which is rigid and durable in construction, and which is adaptable for use under varying circumstances.

Another object of the present invention is to provide an outlet box having a division wall, the division wall having complementary engagement with a cover plate of variable depth or dimension and having complementary engagement with the box and cover plate as well as beng provided with means so that the division wall is capable of being used with an outlet box regardless of the depth or height of the cover plate used.

Numerous other objects and advantages will be apparent throughout the progress of the following specification.

The accompanying drawing illustrates a selected embodiment of the invention and the views therein are as follows:

Fig. 1 is a detail transverse sectional view of the improved outlet box arranged in position in the ceiling and having an improved division wall arranged therein.

Fig. 2 is a plan view of the box shown in Fig. 1.

Fig. 3 is a detail sectional view on the line 3—3 of Fig. 2.

Fig. 4 is a detail perspective view of the improved outlet box division wall.

In the particular embodiment herein shown a barrier plate or division wall 50 is arranged to divide or separate the outlet box 51. The outlet box 51 is made of any suitable metal, such as steel, and comprises a horizontal wall or base 52 and integral side and end walls 53. The base and walls may be provided with a plurality of knockouts 54 for the reception of conduits, cables or conductors leading to the interior of the box. The outlet box may also be provided with openings 55 for fastening the box to the rafters, studs, or other supporting members and for securing the barrier wall in position. The side and end walls may be provided with inturned tongues or flanges 56 for the reception of threaded fastening means for fastening a cover plate 57 to the open face of the box. The cover plate is made in variable depths or thicknesses determinable upon the type of construction with which the box is used. In Fig. 1 the box is shown with a relatively deep cover plate 57 to accommodate relatively thick plaster 58. However, if metal lath construction or thinner plaster is used, the cover plate may only extend down as far as the dotted line 59 shown in Fig. 1. The cover plate is provided with elongated slots 60 through which fastening means 61 pass for fastening the cover plate to the tongues or flanges 56. Also, the peripheral rim 62 of the plate immediately surrounding the opening in the plate may be indented or recessed as indicated at 63 to provide a portion 64 in which holes or openings 65 are formed.

The division wall or barrier 50 is provided with outstanding lugs or fingers 66 which are adapted to be received in a pair of the holes or openings 55 provided in the base of the box. At the edge 67 of the barrier, ears or extensions 68 are provided and these ears 68 are adapted to be received in the slots 65 of the cover plate. The fingers 66 and the ears 68 may be substantially of a length equal to the thickness of the material from which the box is made so that when the barrier plate is assembled in position in the box and the cover plate is applied, they will not protrude beyond the outer surface of the box. In other words, the exterior surface of the box remains smooth and flush. The barrier plate 50 is also provided with an elongated tongue 69 which is provided with cuts or score lines 70 and 71 so that this tongue may be broken off along a score line and make the plate universal and adaptable for use in outlet boxes having cover plates of variable depths. Where the plaster used is relatively thick, as shown in Fig. 1, the complete plate is used. However, where thinner plaster is used, as indicated by the line 59, Fig. 1, the tongue may be broken off at the score line 71. If a flat or non-protruding cover plate is used, the tongue may be broken off at the score line 70. In either instance the exterior edge of the barrier plate will be flush with the exterior surface of the plate where the plate is used or flush with the exterior surface of the box when no closure plate is used.

In assembling the device, the barrier plate is properly positioned of the box so that the fingers 66 will extend through a pair of alined holes in the base. The cover plate or frame 57 is then placed over the open end of the box so that the lugs or projections 68 will be received in the slots 65 in the cover plate. Thus, when the fastening means 61 are screwed in position, the cover plate will be fixed to the box and the barrier plate will be rigidly held in immovable position within the box. In order to accommodate inwardly extending knockouts, as shown in Fig. 1, the barrier plate between fingers 66 may be cut out as indicated at 72. This cutout will allow the edges 73 of the plate to lie against the inner surface of the base and at the same time provide space for the inwardly projecting knockout.

The cover plate 57 may also be provided with tapped openings 74 for the reception of fastening means (not shown) to fasten electrical fixtures thereto. Moreover, it will be noted that the cover plate or frame 57 extends across the open end of the box. The term "inwardly flanged frame" as used in the claim is intended to cover a frame of this character, the word "inwardly" specifically referring to a direction generally transverse to the wall of the box and extending inwardly of said side plane.

The invention provides a new and improved outlet box having useful, unique functions. The box is adapted to be used with finishing coats varying in thickness and therefore the box is capable of being used under varying circumstances. Also, the barrier plate or division wall for separating the outlet box is adaptable for universal operation and use. The particular barrier plate herein shown provides new and further uses for outlet boxes, and permits old boxes to be stocked and still render them capable of new and additional uses without adding to the expense of manufacture of the boxes.

Changes may be made in the form, construction, and arrangement of the parts without departing from the spirit of the invention or sacrificing any of its advantages, and the right is hereby reserved to make all such changes as fairly fall within the scope of the following claim.

The invention is hereby claimed as follows:

In an outlet box having side walls and an open end, an inwardly flanged frame for said open end, and means to secure said frame to said side walls, an upstanding barrier plate arranged within said box to divide said box into a plurality of chambers, lugs carried by said plate adapted to engage with slots in the box, and in the frame to fixedly position the barrier plate in the box when the frame is secured in said position, the barrier plate being freely separable from the structure in a direction generally transverse to the open end when the frame is removed.

HAROLD L. BREITENSTEIN.